(12) United States Patent
Banerjee, Jr. et al.

(10) Patent No.: US 8,756,429 B2
(45) Date of Patent: Jun. 17, 2014

(54) TUNABLE ENCRYPTION SYSTEM

(75) Inventors: Dwip N. Banerjee, Jr., Austin, TX (US);
Sandeep Ramesh Patil, Maharashtra, IN (US); Punadikar Sachin Chandrakant, Maharashtra, IN (US); Ravi A. Shankar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 12/248,982

(22) Filed: Oct. 10, 2008

(65) Prior Publication Data
US 2010/0095127 A1   Apr. 15, 2010

(51) Int. Cl.
*H04L 29/06* (2006.01)
(52) U.S. Cl.
USPC ........... 713/179; 713/176; 713/151; 713/155; 709/201; 709/203
(58) Field of Classification Search
USPC ......... 713/183, 156, 201, 202, 151, 155, 176, 713/179; 709/225, 225.228
See application file for complete search history.

(56) References Cited

U.S. PATENT DOCUMENTS

| | | | |
|---|---|---|---|
| 5,784,566 A * | 7/1998 | Viavant et al. | 709/229 |
| 5,898,784 A | 4/1999 | Kirby | |
| 5,931,947 A | 8/1999 | Burns et al. | |
| 6,405,312 B1 * | 6/2002 | Ly | 713/155 |
| 6,405,315 B1 | 6/2002 | Burns et al. | |
| 6,834,341 B1 * | 12/2004 | Bahl et al. | 713/156 |
| 7,058,805 B2 | 6/2006 | Sibert | |
| 7,177,427 B1 | 2/2007 | Komuro | |
| 7,290,288 B2 | 10/2007 | Gregg | |
| 7,313,557 B1 | 12/2007 | Noveck | |
| 2005/0198490 A1 * | 9/2005 | Jaganathan et al. | 713/151 |
| 2006/0288230 A1 * | 12/2006 | Crall et al. | 713/183 |
| 2007/0226320 A1 | 9/2007 | Hager et al. | |
| 2009/0106348 A1 | 4/2009 | Banerjee et al. | |

FOREIGN PATENT DOCUMENTS

| | | |
|---|---|---|
| WO | 20090031128 | 1/2009 |
| WO | 20090110198 | 4/2009 |

OTHER PUBLICATIONS

Algorithms in the Real World; Guy Blelloch; lecture notes, Apr. 23, 1998.*

* cited by examiner

*Primary Examiner* — Jason Lee
(74) *Attorney, Agent, or Firm* — David A. Mims, Jr.; Robert V. Wilder

(57) ABSTRACT

A method, programmed medium and system are provided for enabling a user to choose a user-preferred encryption type from among a plurality of encryption types listed in a user's Kerberos configuration file. During the ticket granting process in a Kerberos system, a user is requested to select a preferred encryption type to be used in the Kerberos communication from among encryption types contained in the user's Kerberos configuration file. The user-selected encryption type is then implemented for use in encrypting a session ticket (as well as generating the session key of user requested encryption type) for use by the user machine in communicating securely with an Kerberized application server when being communicated by that particular user. Thus, the system allows different users to simultaneously communicate with the same Kerberized application server using a supported encryption type of the user's own choice.

11 Claims, 3 Drawing Sheets

TUNABLE ENCRYPTION SYSTEM

FIELD OF THE INVENTION

The present invention relates generally to information processing systems and more particularly to an improved methodology and implementation for networked communication systems.

BACKGROUND OF THE INVENTION

In requesting an operation to be performed by a server being accessed by a user, it is often necessary to confirm the identity of the user before the requested operation, for example, the accessing of an identified user account, can be performed. Traditional authentication methods are generally not suitable for use in computer networks where attackers can monitor network traffic and intercept passwords. The use of a strong authentication method is therefore needed to avoid the interception of sensitive information such as passwords, user IDs, account numbers and the like. The Kerberos system is an authentication system designed to authenticate, without passing the user password over wire, and to enable an exchange of private information securely across an open network.

In general, the Kerberos process includes a ticket granting service (TGS) to assign a unique key or ticket to each user that logs on to the network. The ticket is then used for authentication and per message encryption. The Kerberos system is a distributed authentication service that allows a client running on behalf of a principal or user to prove its identity to a verifier, such as an application server, without sending authentication data (user password) across a network that might allow an attacker or the verifier to subsequently impersonate the principal.

In a Kerberos system, the session ticket issued by TGS contains the session key and the computed encryption algorithm that is to be used by the client and the server for secure communication. In the current implementation of Kerberos protocol, the encryption type (encryption algorithm) that is used for secure data transfer between the client and the server making use of the Kerberos protocol uses, as the encryption type, the first encryption type match between the list of encryption type entries present in the krb5.conf file (Kerberos client configuration file) on the client machine and the list of encryption types (encryption algorithm) supported by the server's Kerberos principal entry present in the KDC database, during the formation of the session ticket by the Ticket Granting Service (TGS), initiated by the client machine.

There is a single Kerberos configuration file (krb5.conf file) on every client machine having the administrator-defined list of available encryption types. The encryption algorithm that will get selected for secure communication between the client and the server will be the same for all users on the client machine. So for example if DES3 is the first entry in the Kerberos configuration file (krb5.conf) on the client machine and if the server supports, for example, DES, DES3 and AES encryption algorithms, then all users on the client machine will have to communicate with the server only in DES3. If one of the users on the client machine wants to communicate in AES (a higher degree of security) while some other user logged on to the same client machine at the same time wants to communicate with DES encryption type (a less secure but possibly a moderately faster encryption type), this can not be accomplished. With the current implementation, both users will have to communicate with DES3 encryption type as it is the first entry in the configuration file. So, even though a server supports both AES and DES, the users are forced to use the DES3 encryption type that is defined as the first encryption type in the Kerberos configuration file (as the first match decides the encryption type to be used between the client and the server).

Thus, there is a need to provide an improved Kerberos system in which users are provided means by which users may select different encryption types from among a plurality of encryption types contained in a Kerberos configuration file.

SUMMARY OF THE INVENTION

A method, programmed medium and system are provided for enabling a user to choose a user-preferred encryption type from among a plurality of encryption types listed in a user's Kerberos configuration file. In one example, during the ticket granting process in a Kerberos system, a user is requested to select a preferred encryption type to be used in the Kerberos communication from among encryption types contained in the user's Kerberos configuration file. The user-selected encryption type is then implemented for use in encrypting a session ticket (as well as generating the session key of user requested encryption type) for use by the user machine in communicating securely with an Kerberized application server when being communicated by that particular user. Thus, the system allows different users to simultaneously communicate with the same Kerberized application server using a supported encryption type of the user's own choice.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented within a computer system which includes processing means, memory, storage means, input means and display means. Since the individual components of a computer system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a networked computer system, it is understood that disclosed methodology may also be applied in many other available and future devices and systems such as cell phone networks and personal wireless and other hand-held devices and networks, to achieve the beneficial functional features described herein.

The system describes a technique for providing tunable encryption types for every individual user or for a group/set of users (with valid Kerberos credentials) accessing storage via secure Kerberized communication without any change required in the Kerberized application program. The system does not have a user-desired (or policy governed) encryption type associated to only a particular system, but one that is applicable for a particular user throughout the Kerberos realm without use of any static configuration file.

Figure 1:
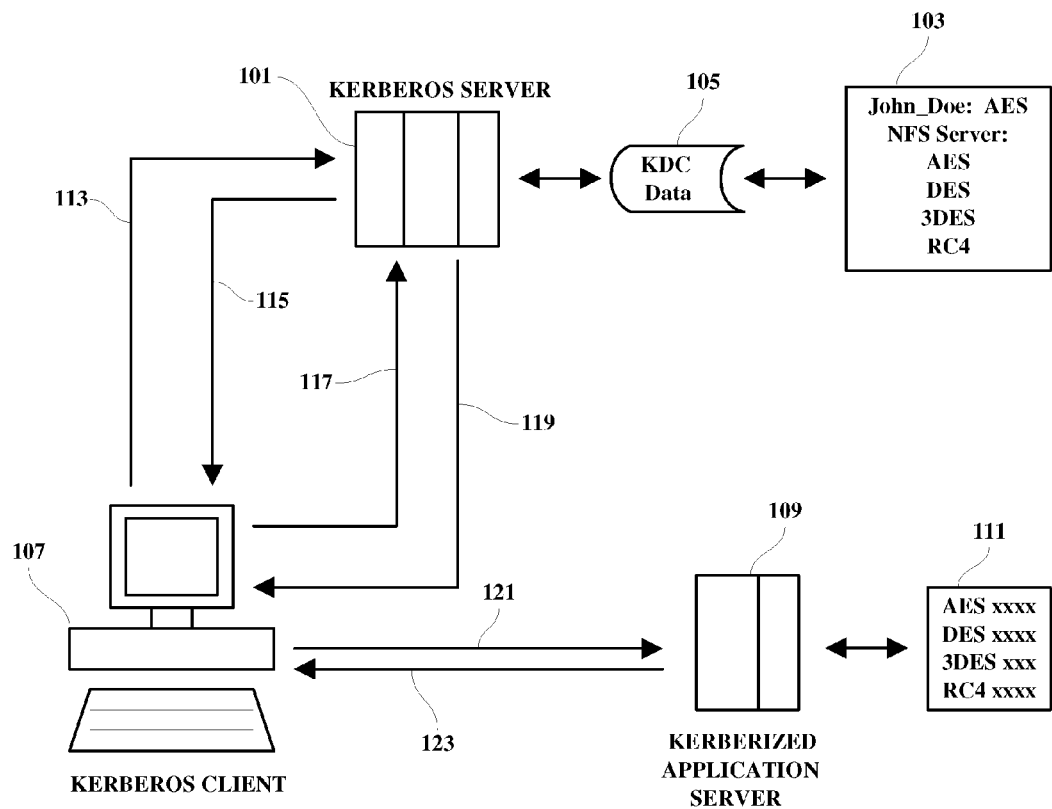
FIG. 1 is an illustration of one embodiment of a system in which the present invention may be implemented.

In an exemplary embodiment illustrated in FIG. 1, a Kerberos server 101, a Kerberos client machine 107 and a Kerberized application server 109 (where the Kerberized application server can be a Network File System V4 [NFS V4] server exporting file space) are all configured for Kerberos system operations. Every individual user logged into the client 107 can select his/her own encryption type (to communicate with the server 101 and application server 109). The selection of the encryption type will be user based and not machine based. Hence, unlike current systems, where all logged-in users on a system use the same encryption type for secure communication, with the proposed system, different users logging into the same machine will be able to securely communicate with the Kerberized application server with different encryption types (e.g. accessing Kerberized NFS V4 server file space with different encryption algorithms). Moreover this feature is optional and hence if the user desires to make use of the existing behavior, he/she is able to accomplish that as well.

The illustrated system allows the designing of solutions (typically Information Lifecycle Management [ILM] based solutions) so that different information/documentation will be able to use different encryption types (based on the accessing user) when used in NFS V4 environment using Kerberos. For example it will allow solutions to define rules/policy such that information hosted by NFS V4 server 109 when accessed by finance department will use stringent encryption algorithm (as confidentiality is critical) while information being accessed by, for example, inventory department from the same NFS V4 server 109 will use less stronger encryption algorithm from the same machine at the same time (as confidentiality is moderate and access speed required is relatively high), which is not currently possible. In current implementations, the encryption types used (for TGS) are decided from the Kerberos applications perspective or the client machine 107 configuration. In the illustrated system, a Kerberos user specific encryption is implemented for the entire realm rather than only application or client machine specific.

While creating the Kerberos principal for a user the administrator explicitly specifies the user-desired/user-specific encryption type as a part of the Kerberos principal attribute. In an AIX implementation, this is possible by using the existing Kerberos user management commands like "addprinc -e" and "modprinc -e" via the Kerberos kadmin interface (where kadmin is the AIX Kerberos user management console). As a result of this step the entered encryption type will be stored as the highest preferred encryption type for the user in the database 103/105. It will be this encryption type which will be given highest preference during encryption negotiation to generate a session key to be used by the user (during Ticket Granting Ticket (TGT) operation) e.g.: #kadmin: addprinc -e AES john_deo.

Next, the user initiates a command to acquire Kerberos Credentials, i.e. to provide user with the facility to specify the desired encryption type to be used for secure Kerberized communication for that session by the user. This user selected encryption type will be used for session key obtained through TGS. The "kinit" command is used by user to authenticate to the Kerberos server 101 and get the TGT and subsequently TGS will be enhanced with a "-e" option. The "-e option" will accept various encryption types supported by the Kerberos flavor as its argument (e.g. AES, 3DES, DES, RC-4 etc). When the user executes the kinit command to authenticate to Kerberos and get valid credentials via KDC (Key Distribution Center) data 105 and stored encryption information file 103 (which the user has to before accessing Kerberized NFS V4 109), he/she will specify the encryption type using the new flag, e.g.: #kinit -e AES john_doe 113. This will result in user getting a Kerberos credential TGT 115 with AES being used as the encryption type.

Next the user executes the command 117 to use the Kerberized application 101: (e.g.: User access Kerberized NFS V4 101 directories). This step generates the service ticket TGS 119 for the user to communicate securely with the Kerberized application server 111. Instead of using the list of encryption types from the default_tgs_enctypes entry in the client machine's krb5.conf file, the Kerberos library code algorithm is modified to fetch the encryption type specified by the user (i.e. the encryption type mentioned in the credential 115 and associated with the TGT). This encryption type will be sent to the KDC 101 while obtaining the service ticket for the application server 111. The KDC 101 will look if the application server 109 supports the mentioned, user-specified encryption type and if so will generate a service ticket 119 and a session key of the user desired encryption type and pass it to the user.

The user will then make use of this session key (of his/her desired encryption type) to securely communicate 121, 123 with the Kerberized application server 109. Thus for different users, the client application can obtain Service Ticket with different encryption types which is not possible in current implementations. So with the disclosed system, it is possible to have two users logged into the same system, 107, where one user makes use of AES encryption type while the other makes use of RC-4 encryption type, and both operations may even occur simultaneously. The terminologies used herein, e.g. TGT, TGS, KDC, session key, session ticket, etc., are specific to Kerberos protocol and details on it can be found in Internet Engineering Task Force (IETF) Request For Comments (RFC) 4120. AES (Advanced Encryption Standard), 3DES (Triple Data Encryption Standard), DES (Data Encryption Standard), RC-4 (ARCFOUR) referred herein are typical encryption algorithms or encryption types supported by Kerberos protocol.

Figure 2:
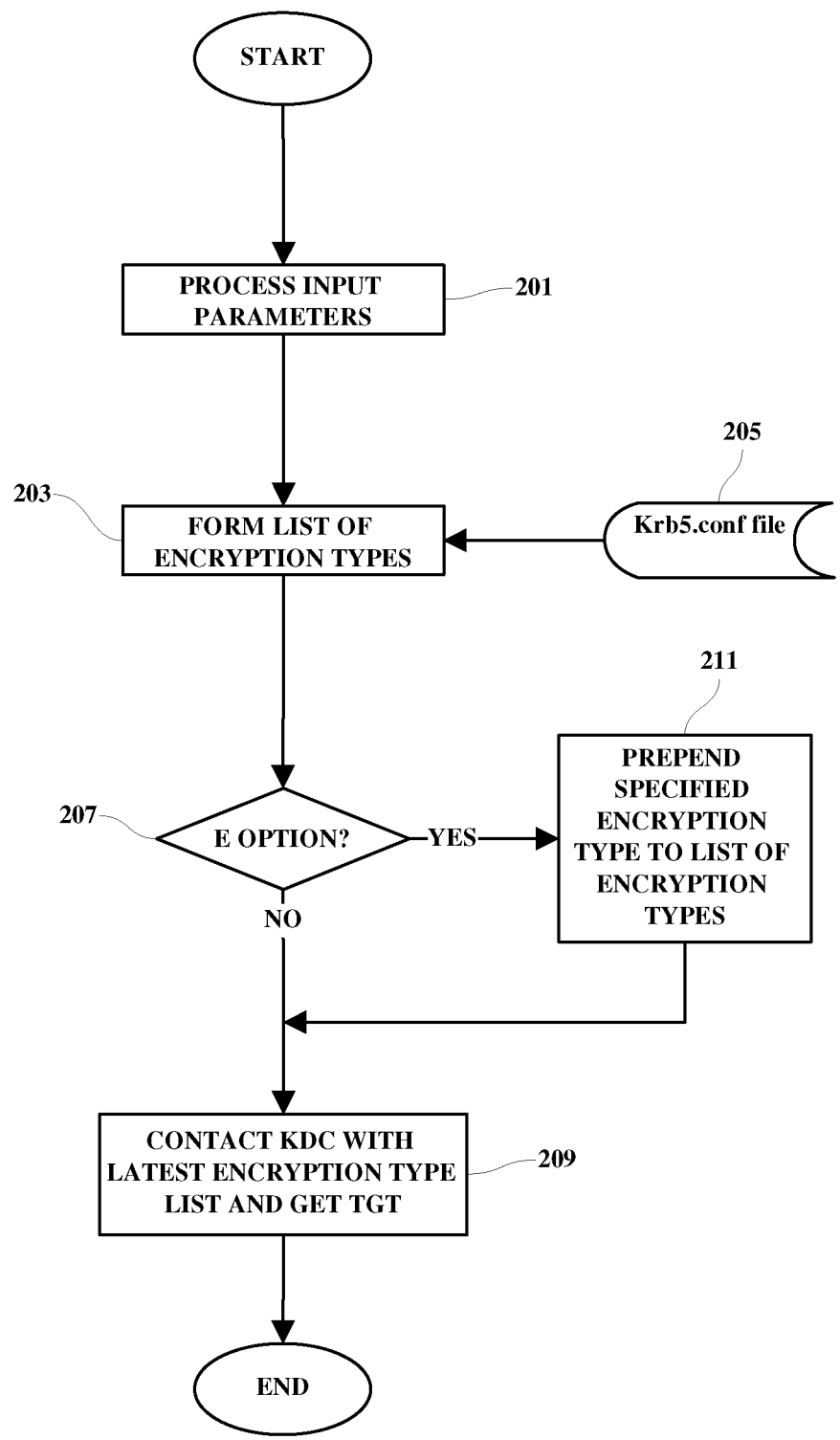
FIG. 2 is a flow chart illustrating a first part of an exemplary sequence of operations, the modified "kinit" program (use to obtain initial Kerberos ticket), which may be implemented in accordance with the present invention.

FIG. 2 depicts a flow chart which indicates proposed processing when a user requests an initial Kerberos ticket (TGT). There are various ways which can be used to obtain the TGT. TGT can be obtained by the user using the commands provided by the Kerberos vendor (like kinit command provided by IBM AIX) or by custom made login applications built using a Kerberos application programming interface. Block 201 indicates the processing of user entered parameters required by the login command/application, i.e., inter alia, username, password and different arguments. Block 203 indicates the process wherein the Kerberos login application formulates the list of encryption types supported by the client machine by referring to the Kerberos configuration file 205 (krb5.conf file). The Kerberos configuration file 205 contains the required configuration parameter for the client machine. The client machine configuration may be specified in configuration file, e.g. krb5.conf file, in the example of an IBM AIX operating system. For other operating systems, it may be present in the operating system's registry. Next, the method identifies if the user has specified a special flag or option, e.g. "-E" 207, as one of the arguments to the login application. If so, it indicates that the user wants to use a specific encryption type for secured communication. The process then prepends 211 the user specified encryption type along with the special flag or option (e.g. "-E" option for kinit command on AIX) to the list of encryption types formulated from the configuration file 203. Prepending the user specified encryption type to the encryption type list gives the specified encryption type a higher preference than other types which are listed later in a list. Subsequently the login process contacts the Kerberos server (KDC) with the latest encryption type list and requests a TGT 209. This makes the Kerberos login command (kinit) or application request for a TGT where the user specified encryption type is of the highest preference. This helps to obtain a TGT with user-specified encryption type. TGT is subsequently used to initiate the TGS process to obtain the session ticket for the user to authenticate and securely communicate with a particular Kerberized target server.

Thus, the exemplary flowchart illustrated in FIG. 2 shows the modified sequence of operations performed in the "kinit" program use to obtain TGT. The "kinit" program processes input parameters 201, required for "kinit". It forms the list of encryption types 203, by reading the krb5.conf file 205. The program checks if the input parameters enlist option "-e" 207, then it prepends that encryption type to the list of encryption types 211, created before in 201. The kinit program then contacts KDC (as stated in FIG. 1) for getting the ticket (TGT) 209.

Figure 3:
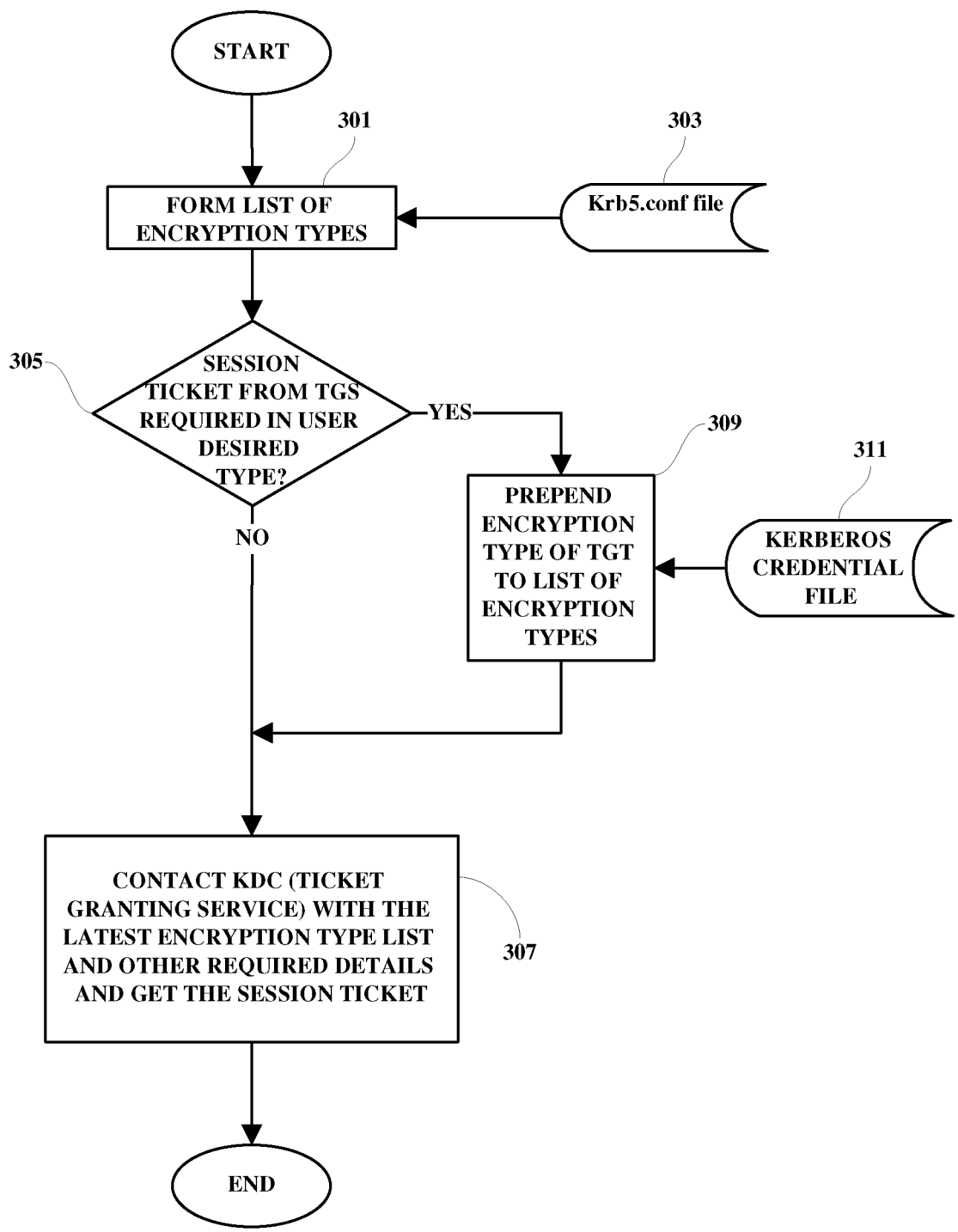
FIG. 3 is a flow chart illustrating a second and subsequent part of an exemplary sequence of operations which may be implemented in accordance with the present invention.

FIG. 3 indicates a subsequent flow of the process to contact KDC (Ticket Granting Service) with the latest encryption type list along with the other required details like Kerberized target server name, TGT, etc., and get the session ticket to authenticate and securely communicate with the Kerberized target server. The sequence of FIG. 3 typically follows the sequence of processes discussed with regard to FIG. 2. As shown in FIG. 3, when the user initiates to obtain the session ticket for a specific Kerberized target server, the system reads the supported encryption types by the client machine from the Kerberos configuration file (like Krb5.conf file) 303, to formulate 301 an encryption type list. If the session ticket is required in the user desired encryption type which was specified by the user while obtaining the TGT 305, then the process 309 will extract the user desired encryption type from the Kerberos credential 311 (where the Kerberos credential is the TGT which was obtained earlier as indicated in FIG. 2) and prepend it to the encryption type list, thus having the user desired encryption type with highest preference (as encryption type which are listed earlier in a list have higher preference than other which are listed later in a list) listed first. Subsequently, the Ticket Granting Service of the KDC will be contacted 307 with the updated/latest encryption type list along with other required details, e.g. the TGT, requested Kerberized target server's name to be contacted, etc., in order to get the session ticket. When the ticket granting service generates the session ticket for the requested target server it will use the latest encryption type list to generate the session key. Since the latest encryption type list 309 contains the user specified encryption type with highest preference, the TGS will generate a session ticket containing a session key which is of the user-specified encryption type (assuming the requested target server supports the user specified encryption type). Thereafter, the session key with user desired encryption type will be used by the requester to authenticate and communicate securely with the Kerberized target server.

Thus, as illustrated in FIG. 3, the modified sequence of operations performed while getting the session ticket from TGS includes forming the list of encryption types 301, by reading the krb5.conf file 303. Next a check is made to determine whether the TGS requested is of the user-desired encryption type 305, if so, the credential file is read 311, and the encryption type of TGT is prepended to the list of encryption types 309 which was prepared earlier in step 301. Next, the KDC (TGS) is contacted to get the session ticket 307.

It is noted that the objectives stated above may be implemented in many different schemes and processes other than the specific changes described in the above examples without departing from the scope of the present disclosure. The details of the Kerberos handshake and generation of tickets can be found in Internet Engineering Task Force (IETF) Request For Comments (RFC) 4120.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any media, including any portable or fixed, volatile or non-volatile memory media device, including CDs, RAM and "Flash" memory, or other semiconductor, optical, magnetic or other memory storage media from which it may be loaded and/or transmitted into other media and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing a secure communication between a user machine and an application server, said method comprising:

enabling a first user to choose a first encryption type from among a plurality of encryption types listed in a Kerberos configuration file;

associating said first user with said first encryption type;

storing said first encryption type and said first user associated with said first encryption type on a server side in a Kerberos registry;

enabling a second user to choose a second encryption type from among said plurality of encryption types listed in said Kerberos configuration file;

associating said second user with said second encryption type;

storing said second encryption type and said second user associated with said second encryption type on said server side in said Kerberos registry; and using said first and second encryption types in encrypting a session tickets for use by said first and second users, respectively, in communicating securely between said user machine and said application server whereby different users are enabled to use different encryption types from said user machine, wherein said first and second encryption types are implemented for use in encrypting session keys for said first and second users, and wherein said first and second encryption types are implemented for use in encrypting session tickets for communication between said first and second users on said user machine and said application server.

2. The method as set forth in claim 1 wherein said application server is a Kerberized application server.

3. The method as set forth in claim 1 and further including a Kerberized server, said Kerberized server including a listing of encryption types available for selection by a plurality of users, said method further including enabling said plurality of users to use different ones of said encryption types simultaneously in different communication sessions from said user machine.

4. The method as set forth in claim 3 wherein said different communication sessions are between said plurality of users using said user machine and an application server.

5. A computer program product comprising a computer-readable, tangible storage device(s) and non-transitory computer-readable program instructions stored on the computer-readable, tangible storage device(s) for processing a secure communication between a user machine and an application server, the computer-readable program instructions, when executed by a processing system, being operable for implementing a method comprising:
  enabling a first user to choose a first encryption type from among a plurality of encryption types listed in a Kerberos configuration file;
  associating said first user with said first encryption type;
  storing said first encryption type and said first user associated with said first encryption type on a server side in a Kerberos registry;
  enabling a second user to choose a second encryption type from among said plurality of encryption types listed in said Kerberos configuration file;
  associating said second user with said second encryption type;
  storing said second encryption type and said second user associated with said second encryption type on said server side in said Kerberos registry; and
  using said first and second encryption types in encrypting a session tickets for use by said first and second users, respectively, in communicating securely between said user machine and said application server whereby different users are enabled to use different encryption types from said user machine, wherein said first and second encryption types are implemented for use in encrypting session keys for said first and second users, and wherein said first and second encryption types are implemented for use in encrypting session tickets for communication between said first and second users on said user machine and said application server.

6. The computer program product as set forth in claim 5 wherein said application server is a Kerberized application server.

7. The computer program product as set forth in claim 5 and further including a Kerberized server, said Kerberized server including a listing of encryption types available for selection by a plurality of users, said processing further including enabling said plurality of users to use different ones of said encryption types simultaneously in different communication sessions from said user machine.

8. The computer program product as set forth in claim 7 wherein said different communication sessions are between said plurality of users using said user machine and an application server.

9. A system for processing a secure communication between a user machine and an application server, said system comprising:
  a user machine; and
  a Kerberized server configured for coupling to said user machine, said system further including:
  selection device for enabling a first user to choose a first encryption type from among a plurality of encryption types listed in a Kerberos configuration file;
  a processing device to associate said first user with said first encryption type;
  a storage device to store said first encryption type and said first user associated with said first encryption type on a server side in a Kerberos registry, said selection device being further operable for enabling a second user to choose a second encryption type from among said plurality of encryption types listed in said Kerberos configuration file, said processing device being further operable to associate said second user with said second encryption type, said storage device being further operable to store said second encryption type and said second user associated with said second encryption type on said server side in said Kerberos registry, wherein said first and second encryption types are implemented for use in encrypting session keys for said first and second users, said processing device being further operable for using said first and second encryption types in encrypting session tickets for use by said user machine in communicating securely with said application server whereby different users are enabled to use different encryption types from said user machine.

10. The system as set forth in claim 9 wherein said Kerberized server includes a listing of encryption types available for selection by a plurality of users, said method further including enabling said plurality of users to use different ones of said encryption types simultaneously in different communication sessions from said user machine.

11. The system as set forth in claim 10 wherein said different communication sessions are between said plurality of users using said user machine and an application server.

\* \* \* \* \*